Figure 1:
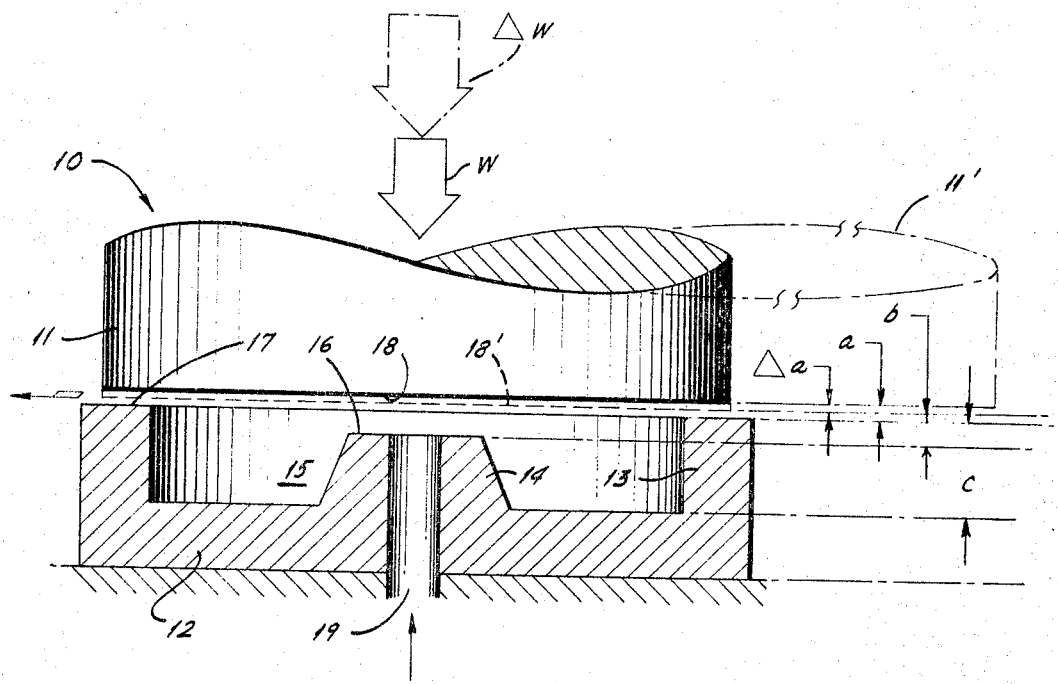

May 30, 1967     J. L. LEBACH     3,322,473
HYDROSTATIC BEARING UNIT FOR ANTENNA STRUCTURE
Filed Nov. 12, 1964

INVENTOR.
JOHN L. LEBACH
BY
ATTORNEY ll
United States Patent Office 3,322,473
Patented May 30, 1967

3,322,473
HYDROSTATIC BEARING UNIT FOR ANTENNA STRUCTURE
John L. Lebach, Los Altos, Calif., assignor to Philco-Ford Corporation, a corporation of Delaware
Filed Nov. 12, 1964, Ser. No. 410,360
3 Claims. (Cl. 308—9)

This invention relates to bearing structures, particularly for a thrust bearing supporting heavy loads. The new bearing is of the so-called hydrostatic kind, supporting the load on flowing viscous fluid. The structure will be described as providing a turntable for supporting a rotating antenna of the type used for instance in radar, radio astronomy, and space operations. As the description proceeds it will be seen that the bearing can also support other loads, such for instance as turntables for processing large workpieces with a high degree of accuracy.

Such a turntable usually presents a heavy static load, and this weight often has very substantial transient load conditions superimposed thereon and modifying it, due for instance to the forces applied to the antenna structure by sudden gusts of wind. Transients may also be caused by intermittent motions and reversals of the structure. Even in the presence of strong transient loads the position of the worktable must often be maintained with high accuracy, particularly when a rotatable antenna is used to receive or transmit a beam of narrow width, rather than an omnidirectional signal. Heretofore such positional accuracy was generally unattainable. Disconcerting vibrations were often set up, which sometimes reached sensitive devices in the antenna structure. It also happened that the equipment became disaligned, losing its proper position for certain periods of time, or permanently. In some cases a transient load even caused metal-to-metal contact of bearing elements normally separated by oil, with resulting severe injury to costly structures.

Heretofore, complex fluid controls were proposed for compensating transient loads. Attempts were made to sense a relatively small initial change of the basic pressure or position, and in response thereto to modify the amount of oil flow or its applied pressure, by means of electromechanical or hydraulic devices, or the like, operating in such a way as to minimize and desirably to correct the transient-induced, positional changes of the supported structure. However, the fluid response structures were complex, expensive, and often unreliable. In most cases they had a relatively long reaction time from the moment the incipient change was monitored until the control elements were adjusted. They also were expensive to build and often were wasteful of energy required for pumpage of oil.

It is the object of this invention to avoid such shortcomings and to provide a simple, reliable and inexpensive turntable bearing which overcomes or at least mitigates the indicated problems by immediate and effective response to transient loads.

Toward this object the invention provides a hydrostatic bearing characterized by provision of several sills, one disposed around the other and spaced therefrom. A specially configured pressure pool and in particular, an oil trapping cavity of annular shape is formed by the provision of such sills. The invention thereby provides a dashpot effect, absorbing transient loads, as will be explained herein.

Figure 2:
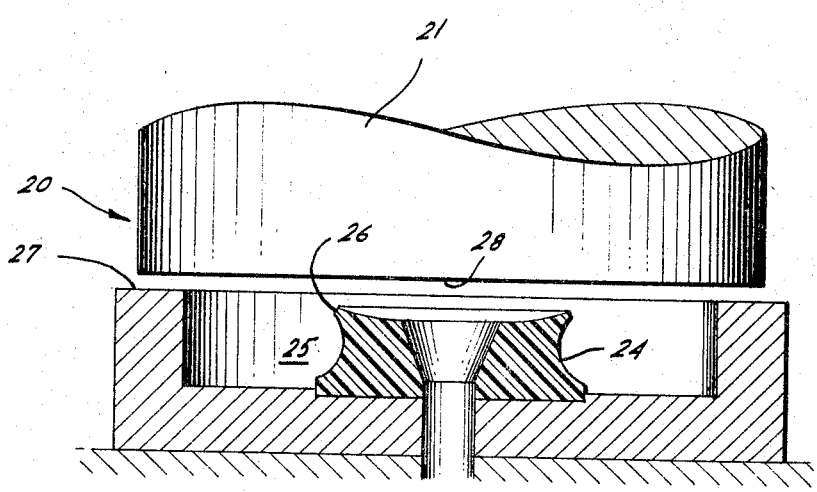

The structure and its operation will now be described more fully in connection with the drawing, wherein FIGURE 1 is a schematic elevational view, partly in central vertical section, of a first embodiment of this invention. FIGURE 2 is a similar view of a modified embodiment. The illustration is not drawn to scale. All vertical dimensions are emphasized in the interest of clear disclosure of certain relationships.

FIGURE 1 shows bearing 10 and a portion of vertical shaft 11 to be supported thereby and which may for instance support the rotatable structure of a radar antenna. The bearing comprises a bottom 12, an outer annular sill wall 13 and, in accordance with the invention, an inner sill wall or member 14. These several elements cooperate to form annular cavity or groove 15 between the outer and inner sill walls. The height of these walls, along with the other vertical dimensions, is shown substantially greater than it actually is in comparison with the various diameters, as has already been noted and explained. Actual dimensions of a typical embodiment will be given hereinafter.

The inner and outer sill walls present at their top, and in upwardly facing orientation, first and second sill surfaces 16, 17, respectively, which are shown as flat and horizontal. A planar, horizontal bottom surface 18 of shaft 11 is shown as overlying both sills. In normal operation, as above indicated, this shaft surface is separated from outer sill surface 17 by gap $a$, and is separated from inner sill surface 16 by the height of this gap plus an additional gap $b$, these gaps being occupied by films of flowing fluid. For the purpose of providing such flowing films a flow of viscous fluid (generally designated herein as oil) is supplied to the bearing, through a central aperture 19.

Initially, when surface 18 of shaft 11 rests on outer sill 17 and is not yet lifted off as indicated, the oil filling the cavity exerts a lifting force on shaft 11 which approximately equals $pA$, when A is the projected area of the pool. The pumping of oil is so adjusted that said lifting force initially lifts the shaft structure from the sill and that, when normal operation has been established (wherein oil flows through the bearing and out of it over peripheral sill surface 17) the oil pressure "floats" the shaft structure.

The provision of an oil pool in the bearing serves, among other things, to ensure that said oil pressure is the same substantially throughout the bearing and that accordingly, surface 18 is supported in horizontal position. Heretofore the oil pool usually was a simple cavity. According to the invention it is annular. This new, annular pool is arranged around inner sill 14, wherefrom the oil flows consecutively over the inner sill surface, the top of the annular oil pool, and the outer sill surface, to a suitable external recirculation system generally indicated by a horizontal arrow, for return to inlet 19.

In further accordance with the invention this recirculation system can pump the oil through the bearing at a constant volume rate Q and under a pressure, in pool 15, substantially maintained at the predetermined value $p$. This pressure then balances static weight load W, applied by shaft 11 and the equipment thereon, thus maintaining the height $a$ of the gap and flowing oil film at the outer sill 17.

This height should be maintained at the selected value $a$ with the least possible variation. However, the application of a transient load having a vertical transient comopent $\Delta W$ tends to push shaft end 18 closer to sill 17. The reduction of gap $a$ caused by such motion is indicated by legend $\Delta a$. The invention serves to minimize such gap reduction, keeping it to a fraction of the small normal gap height. This is achieved by a dashpot effect of oil pool 15, which can be explained as follows.

The transient force tends to lower shaft 11 and thereby to squeeze oil from the peripheral film of flowing oil over sill 17. According to the invention, the transient force also tends to squeeze oil from an oil film passing central sill 16. As a result it increases the pressure prevailing in the pool by an amount $\Delta p$. By virtue of the provision of inner sill member 14 with sill surface 16 thereon, which establishes a film area or passageway of limited height $a+b$ (where $b$ is only a few times the design value of $a$) only a limited amount of oil can be displaced into inlet 19, by the transient force, tending to oppose or retard the normal flow. Therefore the transient force causes an unusually high momentary build-up $\Delta p$ of upward pressure against surface 18. This large build-up of upward pressure offsets the downward transient load to a great extent. Thus the new bearing allows even a large transient load to cause only small downward shaft displacement, in comparison with the temporary decrease of gap height that was thus far encountered on application of a transient load in the absence of inner sill 14.

This peculiar development of pressure build-up, in the new annular pool around the central sill unit, can be compared with the action which occurs in a dashpot. It absorbs a substantial portion of a transient load. Only slowly and in a time-graduated reaction can the several oil films flowing over the inner and outer sills, dissipate the pressure build-up produced by the transient load. By properly adjusting the geometry of pressure pool 15, that is, by providing a properly small vertical gap $b$ between inner and outer sill surfaces 16, 17, as will be noted presently, adequate delay action is achieved and the device effectively counteracts transient loads of typical, short duration, so that such loads normally disappear before the transient pressure build-up has been dissipated. The system reverts to the normal steady state flow condition, and does so without any adjustment of the pumping system.

The data required to apply the invention to actual conditions and requirements are readily determined in each individual case. It is believed sufficient to state, as an example, that a circular bearing 10 with a normal peripheral oil film thickness at the sill of 0.005 inch height and a central gap of 0.020 inch height, an oil pool of 6.75 inch diameter and 0.125 inch depth, an inner sill of about 4 inches diameter and an outer sill of about 1 inch width, can support a static load of 21,000 lbs. subject to maximum transient loads having downward components of up to 23,600 lbs., with gap reductions of less than 0.003 inch, by means of continuous and constant oil flow of two cubic inches per second at nominal 250 p.s.i. pressure in the oil pool, when using SAE–30 oil at 85° F. or oil of equivalent viscosity.

The indicated gap reduction is less than one-third of that which occurs in the absence of the inner sill, when the other conditions remain unchanged. Correspondingly, pointing errors of the supported antenna are reduced from about 4.4 arc seconds to less than 1.3 arc second.

Many modifications are possible with respect to forms, dimensions, and operating data which have been indicated. These data are merely intended to outline typical conditions of one specific application. The important point is that the positional accuracy of the bearing is improved by the use of the inner sill, as is indicated particularly by the pointing data given above.

For the sake of simplicity, bearing 10 has been shown as a single circular structure underlying a cylindrical shaft 11. However, as will readily be seen by persons skilled in the art, it is also possible (and preferable in case of very large bearings) to use a bearing system wherein a ring of bearing units support the overlying shaft or turntable. In such case unit 12, 13 of FIGURE 1 can be interpreted as representing one such unit, underlying a large turntable unit 11′ as suggested in broken lines. In accordance with the invention each bearing unit has a substantially annular pressure pool or oil trapping cavity 15, around an inner sill inlet member 14, although the exact shape of these elements (in plan view) need not be circular or circularly-annular in all cases; for instance, such a unit can be approximately rectangular in plan view.

In order to indicate a further modification of the oil pool structure, available in general accordance with this invention, FIGURE 2 is presented. In this case bearing 20 supports shaft 21 by an arrangement utilizing an inner sill member 24 of flexible material and with a thin upper portion 26 of outwardly tapering form. This arrangement provides for slight restriction of the vertical distance between this inner sill portion 26 and the level of outer sill 27, below shaft bottom 28. A transient load tends to cause momentary upward flexing of inner sill portion 26, whereby return flow of the fluid from the oil trapping cavity 25 is further restricted. The bearing capacity of the inner sill is enhanced by this operation.

While only two embodiments of the invention have been described, details thereof are not to be construed as limitative of the invention. The invention contemplates such variations and modifications as come within the scope of the appended claims.

I claim:
1. In a hydrostatic bearing unit for heavy, horizontally rotatable equipment exposed to transient loads, such as an antenna of the radar and radio astronomy type: a lower bearing member comprising a bottom, an annular outer sill upstanding from said bottom to a generally horizontal top surface, and an inner sill upstanding from said bottom and inwardly spaced from said outer sill to provide a pool area therebetween, said inner sill having generally horizontal top surface slightly below the horizontal top surface of said outer sill and having an upwardly extending aperture to provide an inlet for viscous liquid; and an upper bearing member overlying said sill surfaces and pool to provide for substantially direct flow of said liquid over the top surface of said inner sill across the pool area, and over the top surface of said outer sill, thereby to provide a hydrostatic bearing effect to support said equipment and a dashpot effect to absorb said transient loads.

2. In a bearing unit as defined in claim 1, the feature that said bottom and sills constitute a unitary structure.

3. In a bearing unit as defined in claim 1, the feature that the inner upstanding sill is resiliently flexible.

References Cited

UNITED STATES PATENTS

| | | | |
|---|---|---|---|
| 75,115 | 3/1868 | Bennett | 308—137 |
| 846,795 | 3/1907 | Kruesi | 308—9 |
| 1,083,838 | 4/1914 | Key | 308—9 |
| 2,644,199 | 7/1953 | Miller. | |

MARTIN P. SCHWADRON, *Primary Examiner.*

FRANK SUSKO, *Examiner.*